United States Patent [19]
Hwang et al.

[11] Patent Number: 5,974,815
[45] Date of Patent: Nov. 2, 1999

[54] HUMIDITY CONTROL SYSTEM FOR CARGO CONTAINER

[75] Inventors: Kelly Yoon-Jeong Hwang, Liverpool; Dennis W. Sullivan, Elbridge; Edward M. Basinski, Manlius, all of N.Y.

[73] Assignee: Carrier Corporation, Farmington, Conn.

[21] Appl. No.: 09/017,600

[22] Filed: Feb. 3, 1998

[51] Int. Cl.$^6$ .............................. B01F 3/02; G05D 21/00
[52] U.S. Cl. ........................... 62/176.4; 62/91; 236/44 C
[58] Field of Search ........................ 62/91, 176.4, 176.1, 62/176.6; 236/44 R, 44 A, 44 C

[56] References Cited

U.S. PATENT DOCUMENTS

| | | | |
|---|---|---|---|
| 4,042,016 | 8/1977 | Boochever et al. | 165/20 |
| 4,730,462 | 3/1988 | Rogers | 62/171 |
| 4,750,545 | 6/1988 | Hile et al. | 165/20 |
| 5,146,977 | 9/1992 | Kiser | 165/15 |
| 5,172,558 | 12/1992 | Wassibauer et al. | 62/78 |
| 5,321,907 | 6/1994 | Ueno et al. | 47/58 |
| 5,400,608 | 3/1995 | Steed et al. | 62/91 |
| 5,400,612 | 3/1995 | Hedges | 62/171 |
| 5,695,117 | 12/1997 | Sizemore et al. | 236/44 A |

*Primary Examiner*—William Doerrler
*Attorney, Agent, or Firm*—Wall Marjama Bilinski & Burr

[57] ABSTRACT

A humidity control system employed on a container refrigeration unit, and method of controlling the container humidity, that includes a computer controller and utilizes a humidity sensor, a moisture supply system in combination with output drivers to control and limit the level of relative humidity level within a cargo container to a predetermined range when normal refrigeration system controls are active. The humidity control system operates the moisture supply system in a manner that significantly maintains a high, but not excessive, level of moisture in the circulating air and in the stored cargo. The humidity control system can also be configured to operate as a stand-alone system thereby eliminating the need to provide additional evaporator fan controls for the refrigeration unit.

20 Claims, 6 Drawing Sheets

HUMIDITY CONTROL SYSTEM FOR CARGO CONTAINER

BACKGROUND OF THE INVENTION

1. Field of the Invention

This invention relates to humidity control systems. More particularly, this invention relates to a humidity control system that automatically adjusts the level of humidity within a cargo container that is loaded with refrigerated cargo.

2. Description of the Prior Art

Humidity control systems are known in the art for controlling humidity levels within a cargo container that is loaded with a cargo being refrigerated via a container refrigeration unit. Conventional container refrigeration systems familiar to those skilled in the art of transport refrigeration have generally been more concerned with refrigerating a predetermined cargo than controlling its humidity. However, as cargo containers have become more sophisticated in design and more efficient in holding temperatures stable for longer periods of time, it has become increasingly more important to now also monitor and control the humidity levels within these cargo containers to ensure the cargo being transported arrives at its destination without even minor impairment. In view of the above, attempts have been made by those skilled in the art of transport refrigeration to design and manufacture systems which monitor humidity levels within loaded cargo containers and adjust the humidity accordingly. The problem is complicated by the fact that moisture is added to the nearly saturated air within a container and the humidity measuring device (sensor) is distant from the point of insertion of the moisture. One such system is manufactured by HMS-RYAN located in Redmond, Wash. The HMS-RYAN system monitors the humidity and subsequently adjusts the amount of moisture in the captured air within a sealed area by varying the speed of a metered water pump. Variable-speed pumping systems are disadvantageous in that it is difficult to maintain precise control of the container humidity level without continuously running the water pump. This process reduces the reliability of the humidity system as the water pump seals and internal moving parts, including motors and bearings, deteriorate more rapidly with continued long term usage. Further, the pumps tend to be noisy, particularly as they age, giving the end users the perception that the system is not working properly or otherwise is working inefficiently. The continuous running water pumps therefore require nuisance periodic maintenance or replacement. A continuous running water pump may also add an excessive quantity of moisture that will saturate packaging and condense upon produce.

Still needed, but not available with humidity monitoring and control systems presently known in the art is a humidity monitoring and control system that is capable of also reliably and efficiently establishing and maintaining precise humidity levels within a loaded cargo container, either as a stand-alone system or in combination with a transport refrigeration system.

SUMMARY OF THE INVENTION

Accordingly, the present inventive transport refrigeration system provides a structure and method intended to overcome many of the shortcomings and attendant disadvantages of known container/transport refrigeration humidity control systems that share problems considered unavoidable within the industry, some of which have been discussed herein above. The present invention surmounts these problems with a radical new structure that combines a microprocessor based system controller (hereinafter referred to as "controller") with a strategically positioned humidity sensor to improve and optimize refrigeration system humidity control within a loaded and sealed cargo container. The humidity control system constructed according to one preferred embodiment of the present invention comprises a microprocessor or computer controller implemented device to control the loaded cargo container humidity level to a desired value (range) during periods when the cargo container is sealed. The preferred device comprises: the controller; an input device in communication with the controller; a computer program including a software algorithm that the controller responds to; and a data storage unit, wherein digitized humidity data can be extracted and supplied to the controller such that the controller, directed by the software algorithm, can optimally and automatically control cycling of a water supply to the cargo container (wherein the preferred embodiment water supply is a water pump supplying water to a nozzle type atomizer water discharge unit), using the digitized humidity data provided by a humidity sensor, and algorithmically defined interrelationships between the digitized humidity data and the digitized cargo data.

As used herein, the following words have the following meanings. The word "enhance" means a process of developing refined data by interpreting related data points from an existing data base to generate new data points based on extrapolation, interpolation, modeling, extension, or the like, or a combination thereof to increase the number of data points to include the newly generated data points. In this way, the existing data base can be "enhanced". The word "synthesize" means to create an enhanced model from a set of digitized data points. As used herein in relation to the use of data points from digitized transducer information, to "synthesize" a control model means to create a control model base including new data points created by a process wherein existing data points from the existing data base are "enhanced" and an "enhanced" model is created. The words "software algorithm" means an algorithmic program used to direct the processing of data by a computer or data processing device. The word "extracting" describes a device-implemented mathematical process or software directed computer process of selecting data from a given set of data points based on a predefined criteria for selecting data. "Data extraction" is a software directed or device-implemented process of selecting data from a given set of data points based on a predefined criteria for selection among the set. The word "expanding" means creating new data points based on a parameter or parameters consistent with a selected group of existing data points. The words "software implemented" as used herein refer to the use of a software program on a particular computer system. Similarly, the words "computer implemented device" refer to the use of a computer system on a particular device. The words "discrete data" as used herein are interchangeable with "digitized data", and "digitized data" as used herein means data which are stored in the form of singularly isolated, discontinuous data or digits. The words "data processing device" as used herein refer to a computer and an interface system. The interface system provides access to the computer such that data could be entered and processed by the computer.

A feature of the present invention is the provision of a container/transport humidity control system that responds to a software algorithm to control the aforesaid water supply cycling to a container during periods of cargo transport, thereby eliminating the need for a variable-speed controlled water pump to be installed in a refrigeration system.

Another feature of the present invention is the provision of a container/transport refrigeration system having an integrated humidity control system, thereby increasing user perception of system operation and capability.

Yet another feature of the present invention is the provision of a container/transport humidity control system that can function as a stand-alone system or can optionally be integrated as part of a container/transport refrigeration system.

Still another feature of the present invention is the provision of a container/transport humidity control system that minimizes water condensation on a cargo being transported by a refrigerated cargo container;

Still another feature of the present invention is the provision of a container/transport humidity control system that is capable of providing electronic data logging of trip/cargo performance history.

Still another feature of the present invention is the provision of a container/transport humidity control system that promotes longer humidity control system equipment life.

Still another feature of the present invention is the provision of a container/transport humidity control system that enhances the reliability of humidity control system performance.

Still another feature of the present invention is the provision of a container/transport humidity control system that provides optimal resource management due to minimal usage of available water supply.

Still another feature of the present invention is the provision of a container/transport humidity control system that provides the collected water from the defrost cycle of a refrigeration system as a water supply.

Still another feature of the present invention is that the use of controller software quantities that are alternatively preset or adjustable, and reflect variable cargo characteristics, variable container characteristics, and variable control objectives.

From the foregoing, it is clear that the present inventive humidity control system versatility, reliability and performance is greatly enhanced over existing systems. Other features of the present inventive apparatus include ease of use, enhanced serviceability, maintainability, upgradability, and enhanced expansion and diagnostics capability.

BRIEF DESCRIPTION OF THE DRAWINGS

Other objects and features of the present invention and many of the attendant advantages of the present invention will be readily appreciated as the same becomes better understood by reference to the detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way or representation and not limitation. Numerous other modifications and embodiments can be devised by those skilled in the art which fall within the scope and spirit of the principles of this invention.

DETAILED DESCRIPTION OF THE PREFERRED EMBODIMENT(S)

The preferred embodiments described herein as follows address the long felt need by those in the container/transport refrigeration industry to provide a highly efficient and versatile cargo container humidity control system capable of stand-alone operation or operation in combination with a container/transport refrigeration unit. In accordance with the present invention, the preferred embodiments described herein can readily and reliably function to monitor and control humidity levels within a sealed cargo container without the need for a variable-speed controlled water pump to variably adjust the amount of water added to the container air or a second system controller and user interface. Transport refrigeration systems are known to monitor and control the temperature within cargo containers. Therefore, the present inventors realized that a transport refrigeration system could be modified according to the present invention, to also monitor and control the aforesaid humidity level within a sealed cargo container. A brief description of transport refrigeration operation is first presented herein below with reference to FIG. 1 to provide a background in preparation for a discussion of the preferred embodiments of the present inventive humidity control system that follow there after.

Figure 1:
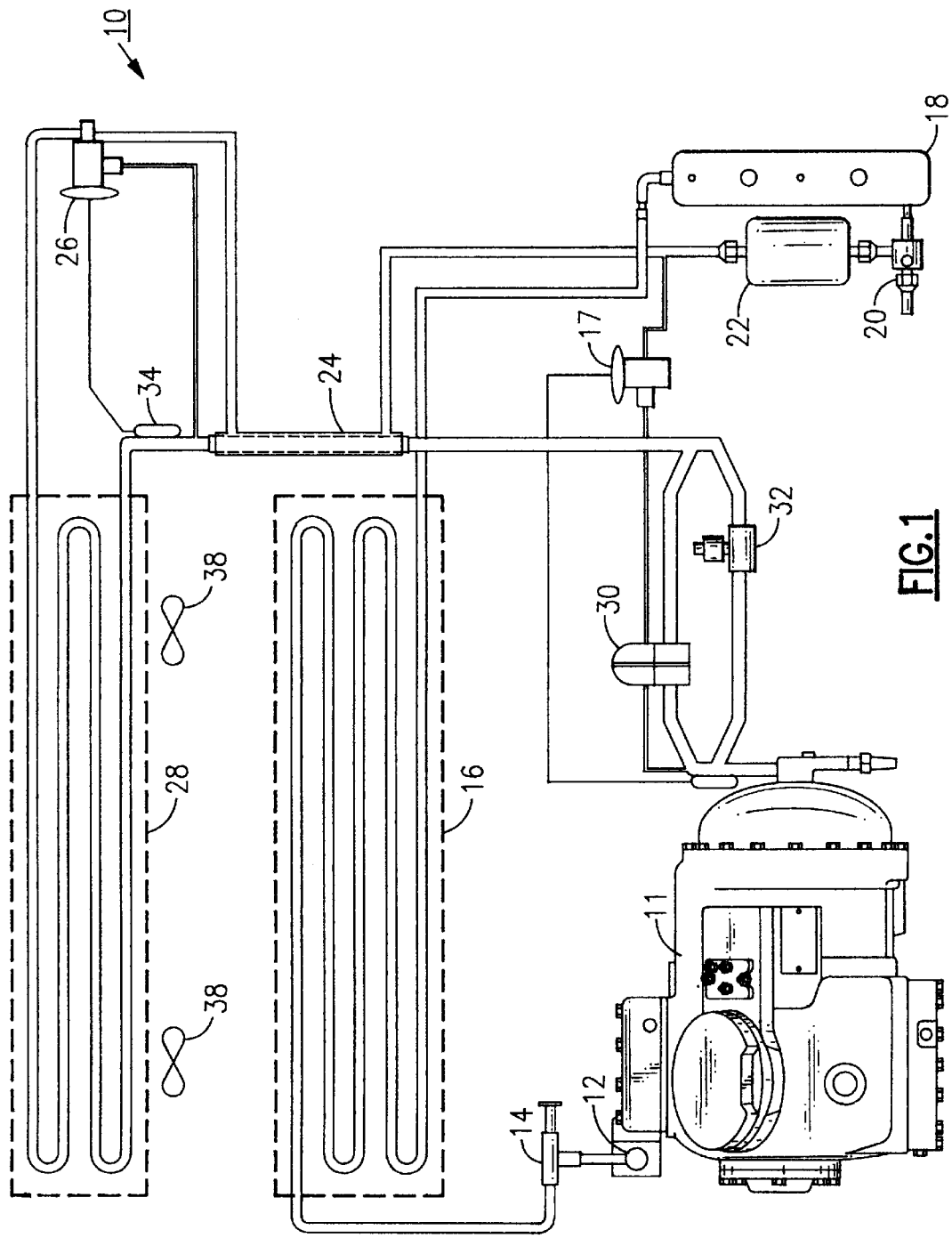
FIG. 1 is a simplified schematic diagram illustrating one embodiment of a container refrigeration system familiar to those skilled in the art of container/transport refrigeration.

With reference now to FIG. 1, a simplified schematic diagram illustrates one embodiment of a container refrigeration system 10 familiar to those skilled in the art of container/transport refrigeration systems. Operation of the refrigeration system 10 can best be understood by starting at the compressor 11, where the suction gas (refrigerant) is compressed to a higher temperature and pressure. When operating with the air-cooled condenser 16, the gas flows through the compressor discharge service valve 12 into a pressure regulator valve 14 that is normally open. The pressure regulator valve 14 restricts the flow of refrigerant to maintain a predetermined minimum discharge pressure. Refrigerant gas then moves into the air-cooled condenser 16. Air flowing across a group of condenser coil fins and tubes cools the gas to its saturation temperature. By removing latent heat, the gas condenses to a high pressure/high temperature liquid and flows to a receiver 18 that stores additional charge necessary for low temperature operation. Conventional condenser pressure control transducers/sensors can be installed within the receiver 18 or can be located at any point on the high pressure side of the refrigeration system 10 to adapt the system 10 for use with pressure control logic such that high side pressures can be limited and maintained. The words "high pressure side", as used herein refer to that portion of the refrigeration system between the compressor discharge service valve 12 and the thermostatic expansion valve 26. From the receiver 18, the liquid refrigerant continues through a manual liquid line valve 20, a filter-drier 22 (that keeps refrigerant clean and dry), and a heat exchanger 24 that increases subcooling of liquid refrigerant to a thermostatic expansion valve 26. As the liquid refrigerant passes through the orifice of the expansion valve 26, some of it vaporizes into a gas (flash gas). Heat is absorbed from the return air by the balance of the liquid, causing it to vaporize in the evaporator coil 28. The vapor then flows through a suction modulation valve 30 (and a suction solenoid valve 32 under some conditions) back to the compressor 11. A thermostatic expansion valve bulb 34 on the suction line near the evaporator coil 28 outlet controls the thermostatic expansion valve 26, maintaining a constant superheat at the coil outlet regardless of load conditions, except at abnormally high container temperatures such as during pulldown (valve at maximum operating pressure condition). The cargo container air to be cooled is passed around the evaporator 28 tubes/fins where heat is removed from the air as it is absorbed by the evaporator 28 thereby causing the temperature of the low pressure refrigerant vapor to increase before it is returned to the compressor 11. The present inventors realized that the refrigeration system 10 could be modified to also control the humidity level within a cargo container. However, it shall be seen from the discussions herein below, that the present inventive humidity monitoring and control system can just as well function as a stand-alone humidity control system, in the absence of any refrigeration system.

Figure 2:
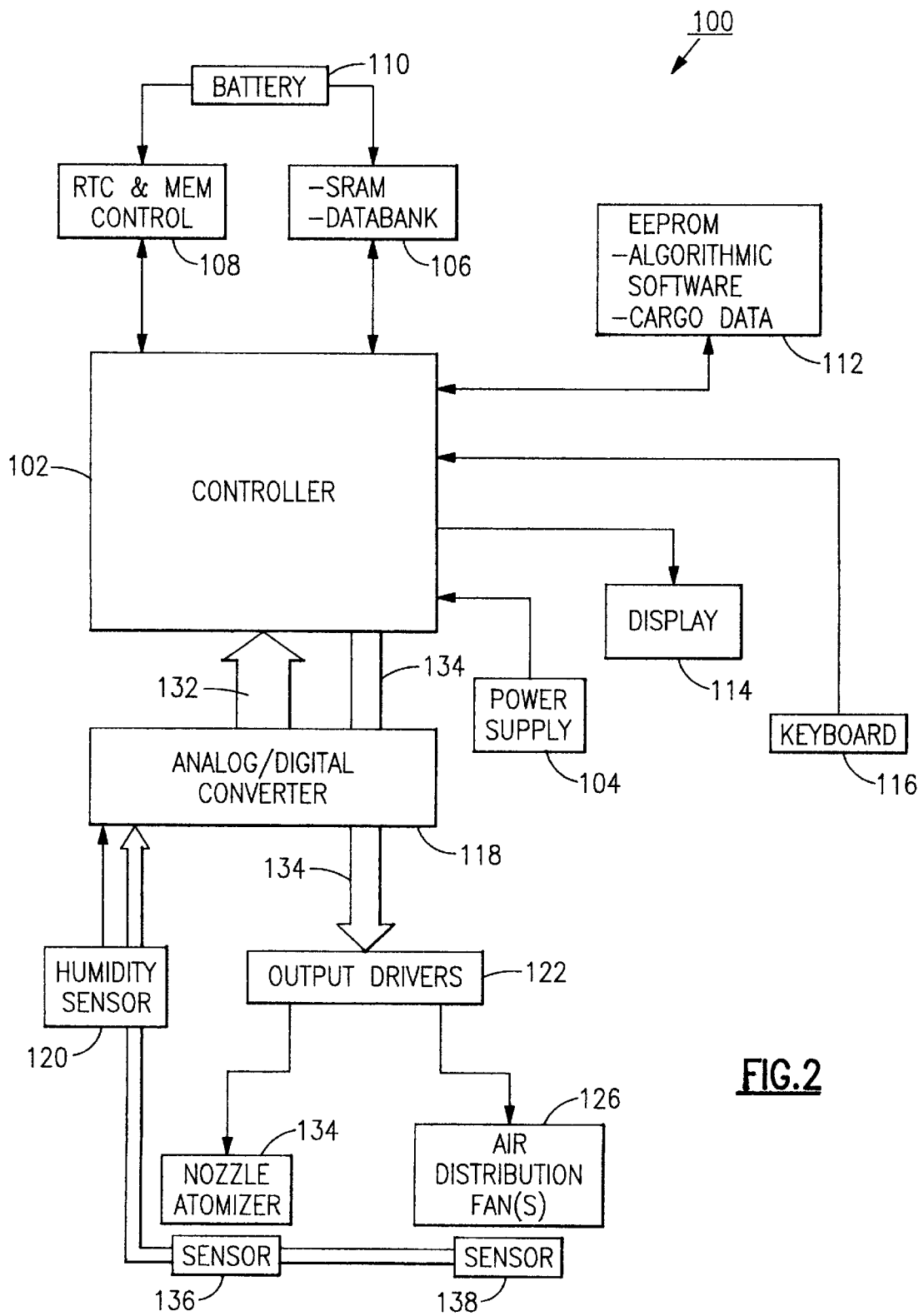
FIG. 2 is a block diagram illustrating a humidity monitoring and control system that is suitable for use as a stand-alone humidity monitoring and control system or in combination with the container/transport refrigeration system shown in FIG. 1.

Looking now at FIG. 2, a block diagram illustrates a humidity monitoring and control system 100 that is suitable for use with the transport refrigeration system 10 shown in FIG. 1 to monitor and control the humidity within a sealed cargo container. As stated herein before, the present invention is not so limited however, and it shall be readily understood, that the humidity control system 100 will function equally well as a stand-alone humidity controller. The humidity monitoring and control system 100 is seen to include a controller 102 receiving signals from an analog-to-digital converter 118. The analog-to-digital converter 118 digitizes signals from a humidity sensor 120 strategically placed in the cargo container or the container/transport refrigeration unit. As will be presently explained in detail, the controller 122 selectively controls one or more fan(s) (enumerated as 38 in FIG. 1), and/or the water atomizer and water pump 124, based upon the digitized values read from the humidity sensor 120. The fan(s) 38 will be dedicated to humidity control in a stand-alone humidity monitoring and control system and can be the evaporator fans 38 when used in combination with a container/transport refrigeration unit. Predetermined humidity values and prescribed cargo data are stored in a memory unit 112 along with a software algorithm (shown in FIGS. 3a and 3b). Most preferably, the predetermined humidity values, prescribed cargo data and the software algorithm are stored in a memory device such as an EEPROM familiar to those skilled in the computer arts. It will readily be appreciated that the present invention is not limited to the exact embodiment shown in FIG. 2 however, and that many other types of memory devices and system architectures can also be used to accomplish the present invention. Most preferably, the control system 100 has a real time clock and memory control unit 108 as well as a random access memory unit 106 and a battery 110 power back-up capability to ensure the logging of data during periods of lost power to the humidity monitoring and control system 100. The aforesaid digitized humidity sensor 120 data is then stored in the random access memory unit 106 for processing by the computer 102 in accordance with instructions prescribed by the software algorithm. Control system 100 is also seen to have a power supply 104 for providing power to the other control system circuitry. A display 114 and a keyboard (keypad) 116 or like device are provided to supply visual humidity readings and allow an operator the ability to manually access and modify the control system 100 operating parameters if desired or necessary. Thus, a system 100 operator can easily customize the system set points, for example, to operate during precisely defined needs to achieve a different level of humidity for a prescribed cargo.

In the preferred embodiment, a sole humidity sensor is provided that is disposed within the container proximate the finish of the return air stream 406 circuit, and proximate the refrigerator and the humidity control systems fixtures that abut the air stream, for an optimized maintenance access, and for a provided air stream humidity reading that reflects the humidity at the finish of the circuit, as a preferred measure for the computer executed algorithm. Alternatively, and in accordance with this invention, the sole humidity sensor may also be disposed elsewhere within the air stream circuit, and alternatively a plurality of humidity sensors may be disposed at a plurality of locations within the air stream circuit, with the software algorithm reflecting the configuration of humidity sensors in the determination of the output drivers 122 inputs.

Strategically operating the water atomizer and water pump 124 in combination with the predetermined set of air distribution fans 38 will yield the desired result of accurately and precisely controlling the cargo container humidity level to a maximum value using the system controller. The present inventors realized that the evaporator 28 and evaporator fans 38 normally used to supply cool air to the cargo container during refrigeration cycles could also be used during appropriate time periods, as the predetermined set of air distribution fans 38 to control distribution of the cargo container humidity. However, this approach is somewhat flexible, and therefore, it may be preferable to use a set of independent fans dedicated solely for humidity control under appropriate circumstances. While a water atomizer in cooperation with a water pump and a distribution fan are the preferred embodiment for an introduction of gaseous $H_2O$ into the airstream 406, it is understood and contemplated that other systems may alternatively be used, in accordance with this invention, and these other systems may include a gravity fed water tank and a water produced by the refrigeration equipment defrost cycle as water sources, a sprayer, an ultrasonic vibrator, a steam jet, a nozzle, and a generic evaporative device.

As stated herein before, the purpose of the software algorithm is to control the processing of the controller so as to appropriately direct the output drivers 122 in activating and deactivating the introduction of gaseous $H_2O$ into the air stream 406 at appropriate times, and accordingly control and limit the cargo container humidity level to a defined range, either when the normal refrigeration system controls are inactive or independently of a normal refrigeration system operation. In general, the controller 102 is combined with one or more humidity sensors 120 to sense the cargo container humidity level and selectively initiate one or more actions when the aforesaid humidity level is below a preset limit.

For example, the output drivers 122 can selectively turn the air fan(s) 38 on in combination with activating and deactivating a water atomizer and water pump 124, to control the level of humidity within the cargo container.

Figure 3A:
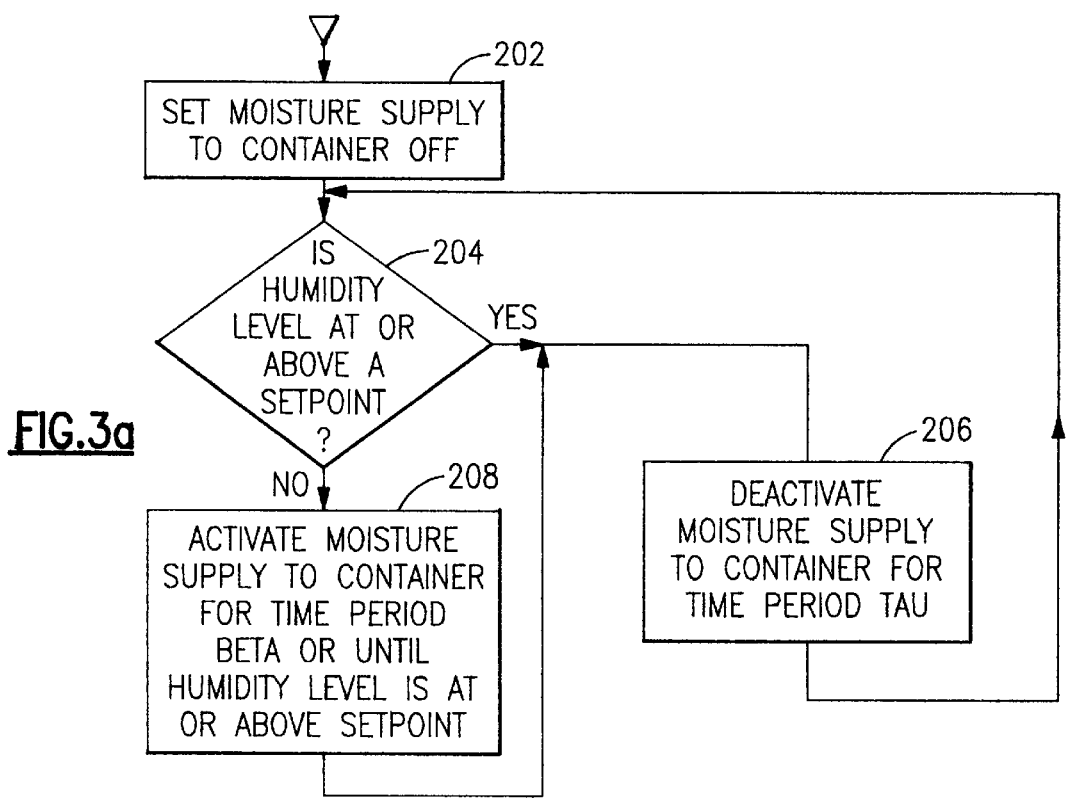
FIG. 3a illustrates a software algorithm in accordance with an embodiment of the present invention that activates the $H_2O$ supply to the container for a first time period, and deactivates the $H_2O$ supply to the container for a second time period, suitable for use with the humidity monitoring and control system shown in FIG. 2.

FIG. 3a illustrates the preferred software algorithm for use with the humidity monitoring and control system 100 shown in FIG. 2. With reference now to FIG. 3a, it can be seen that the aforesaid humidity control process begins in block 202 with an initial setting of the controller to a state of not supplying the gaseous $H_2O$ to the container. The controller 102 extracts data from a humidity sensor 120 disposed at the finish of the return air stream 406 circuit to determine if the humidity level is equal to or greater than a set point target, as depicted in block 204. The set point target is determined by factors including but not limited to type of cargo container, type and amount of cargo, duration of storage, and the like. If the humidity level is equal to or greater that the set point target, program control passes to block 206, where the supply of gaseous $H_2O$ to the container is deactivated for a time period Tau, and control, after the time period Tau, passes back to block 204. Alternatively, if in block 204 it is determined that the humidity level is not equal to or greater than the set point target, control passes to block 208 where the supply of gaseous $H_2O$ to the container is activated for a time period Beta or until the humidity level in the container is at or above the set point. After the processing of block 208, control passes to block 206 for a deactivation of the gaseous $H_2O$ supply to the container for timer period Tau, and subsequently back to block 202.

Tau and Beta may both be determined from a mathematical model or from an experimental process, and shall depend upon such factors as container size, cargo size, air circuit layout, humidity sensor configuration, ambient conditions, duration of cargo containment, and cargo nature. For a single sensor placed at the finish of the air stream circuit, Beta is the time for an infusion of enough gaseous $H_2O$ into the air stream circuit to affect the complete air circulation circuit, and Tau is the time for that infusion to realize a steady state effect at the sensor. For a standard forty foot loaded shipboard maritime container, the preferred default value of Beta is three minutes and the preferred default value of Tau is four minutes.

Similarly, the set point humidity may be determined from a mathematical model or from an experimental process, and shall depend upon such factors as ambient condition, duration of cargo containment, and nature of the cargo. The preferred default set point is typically 95% humidity, or the point when condensation will not occur and product transpiration will be at a minimum.

Table 1 below illustrates the relationships between humidity controller 100 status, relative humidity within the cargo container, and time elapsed during the humidity control process.

With reference now to Table 1, the aforesaid humidity monitoring and control process depicted in FIG. 3a for a Beta of three minutes, a Tau of four minutes, and a set point of 95% humidity can be seen to function in a manner that establishes and maintains a 95% relative humidity level within a predetermined cargo container. Those skilled in the art of humidity control systems will understand that there is a tolerance band about the set point to minimize cycling and compensate for device limitations. At time zero, the system controller 102 determines that the humidity level is at 83% (that is, the humidity level is below 95%) and activates the humidity control apparatus, preferably the fans 38 and atomizer and water pump 124, for a period of three minutes, at which time the humidity level at the sensor is 85.5%. The humidity control apparatus is next deactivated for a time period of four minutes at which time the humidity has leveled off at the sensor to 87%. The humidity control apparatus is again activated for a three minute period and reaches 89.5%, subsequently deactivated for a four minute period, at which time it levels off at 91%, and activated for another three minute period, reaching 93.5%. During the next four minute deactivation period, the container humidity levels is stabilized at 95%.

TABLE 1

| Time (min) | Humidity System Status | Relative Humidity (%) |
| --- | --- | --- |
| 0 | OFF | 83 |
| 1 | ON | 83½ |
| 2 | ON | 84 |
| 3 | ON | 85½ |
| 4 | OFF | 86¼ |
| 5 | OFF | 86½ |
| 6 | OFF | 87 |
| 7 | OFF | 87 |
| 8 | ON | 87¼ |
| 9 | ON | 88 |
| 10 | ON | 89½ |
| 11 | OFF | 90½ |
| 12 | OFF | 90¾ |
| 13 | OFF | 91 |
| 14 | OFF | 91 |
| 15 | ON | 91¼ |
| 16 | ON | 92 |
| 17 | ON | 93¾ |
| 18 | OFF | 94½ |
| 19 | OFF | 94¾ |
| 20 | OFF | 95 |

Figure 3B:
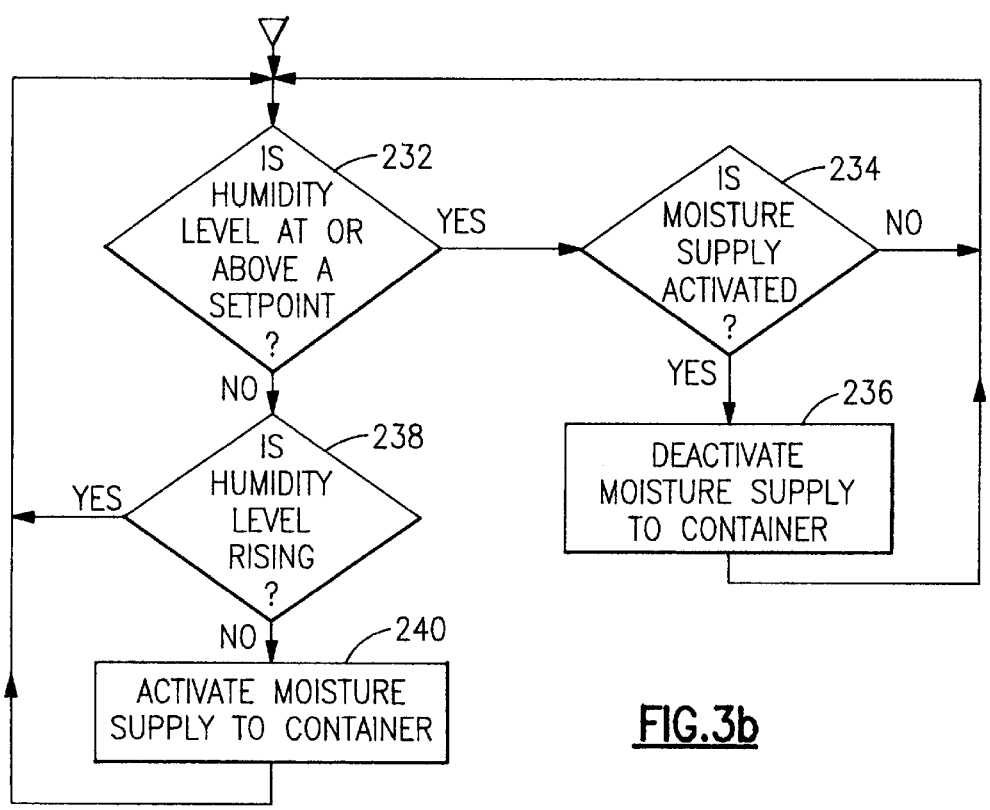
FIG. 3b illustrates a software algorithm in accordance with an embodiment of the present invention that activates the $H_2O$ supply to the container if the humidity at the sensor is below a target humidity, and deactivates the H2O to the container if the humidity at the sensor is at or above the target humidity.
Figure 4:
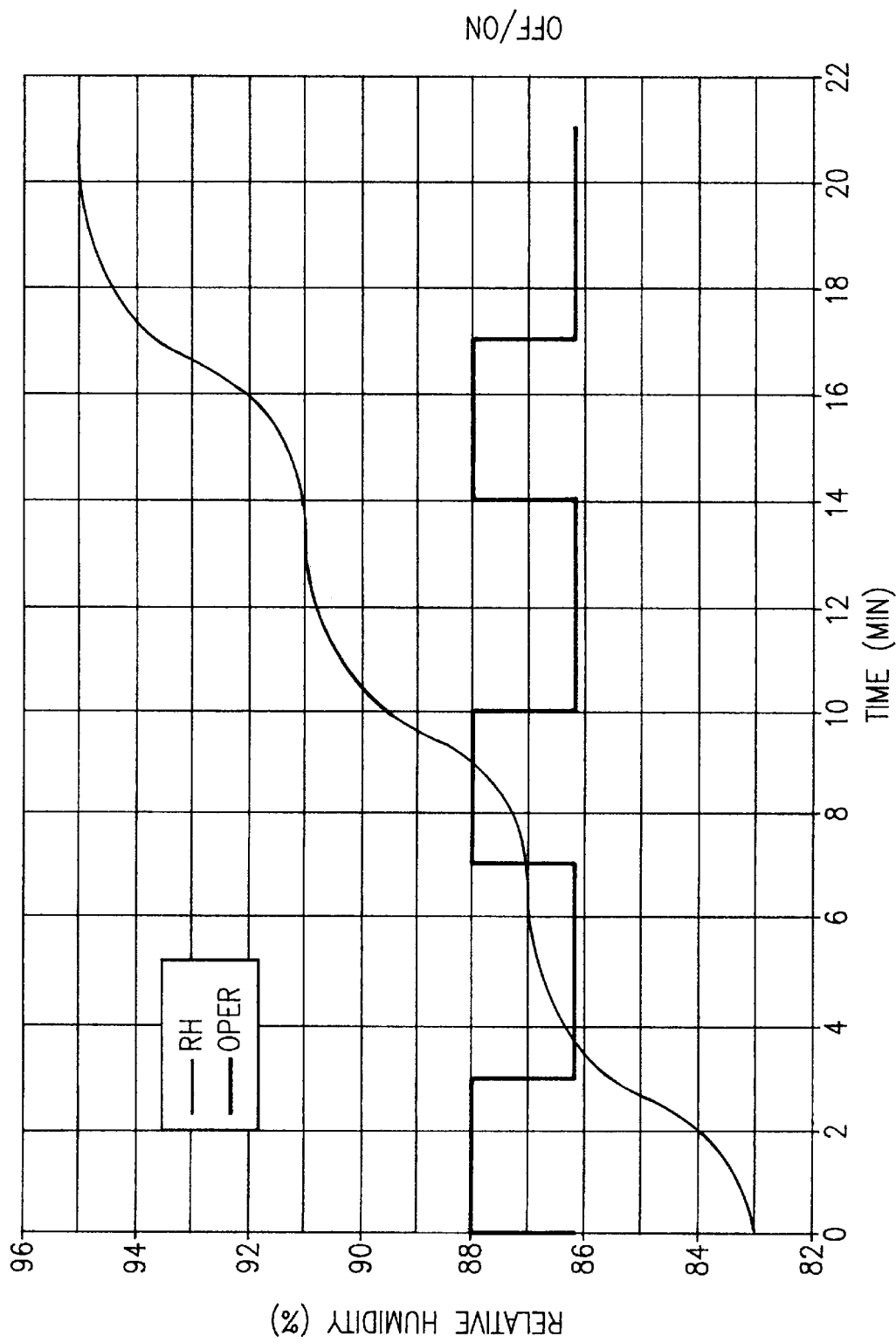
FIG. 4 is a graph illustrating the humidity control logic of FIG. 3a. The graph plots humidity level at a single sensor near the finish air stream circuit of a container against time, as well as the activation and deactivation of the $H_2O$ supply to the air stream circuit of the container against time.

Alternatively, it may be seen by an analysis of FIG. 4, that for a properly selected Beta and Tau, the humidity level at the sensor levels off at the end of a deactivation cycle. Hence, an appropriate computer program to control the activation and deactivation of the $H_2O$ supply is to activate the $H_2O$ supply to the container for a time period Beta, turn the $H_2O$ supply off, and activate the supply again when the rate of change of the humidity level at the sensor has within a range of humidity change, leveled off. Alternatively, the humidity level within the container may be controlled by merely activating the $H_2O$ supply, when the humidity level at the sensor is not at or equal to the set point target, and deactivating the $H_2O$ supply to the container when the humidity level at the sensor is at or above the set point. This will give a system that humidifies at a faster rate, but is controllable within a broader range. This control algorithm is portrayed in FIG. 3b.

Referring to FIG. 3b, If the humidity is equal to or greater than the set point, the system controller proceeds to deactivate the $H_2O$ supply as shown in block 236. If the $H_2O$ supply is already inactive, no action is taken as depicted in block 234. While the $H_2O$ supply proceeds to supply the container air with additional moisture, the system controller continues to monitor the humidity level as illustrated in block 232. If the humidity level is less than or drops below the set point, then the system controller determines if the humidity level is rising as shown in block 238. If the humidity level is found to be rising, the humidity control system 100 then continues to monitor the humidity level as illustrated in block 232. If the humidity level is not rising, the system controller activates the H₂O supply in block 240.

Figure 5:
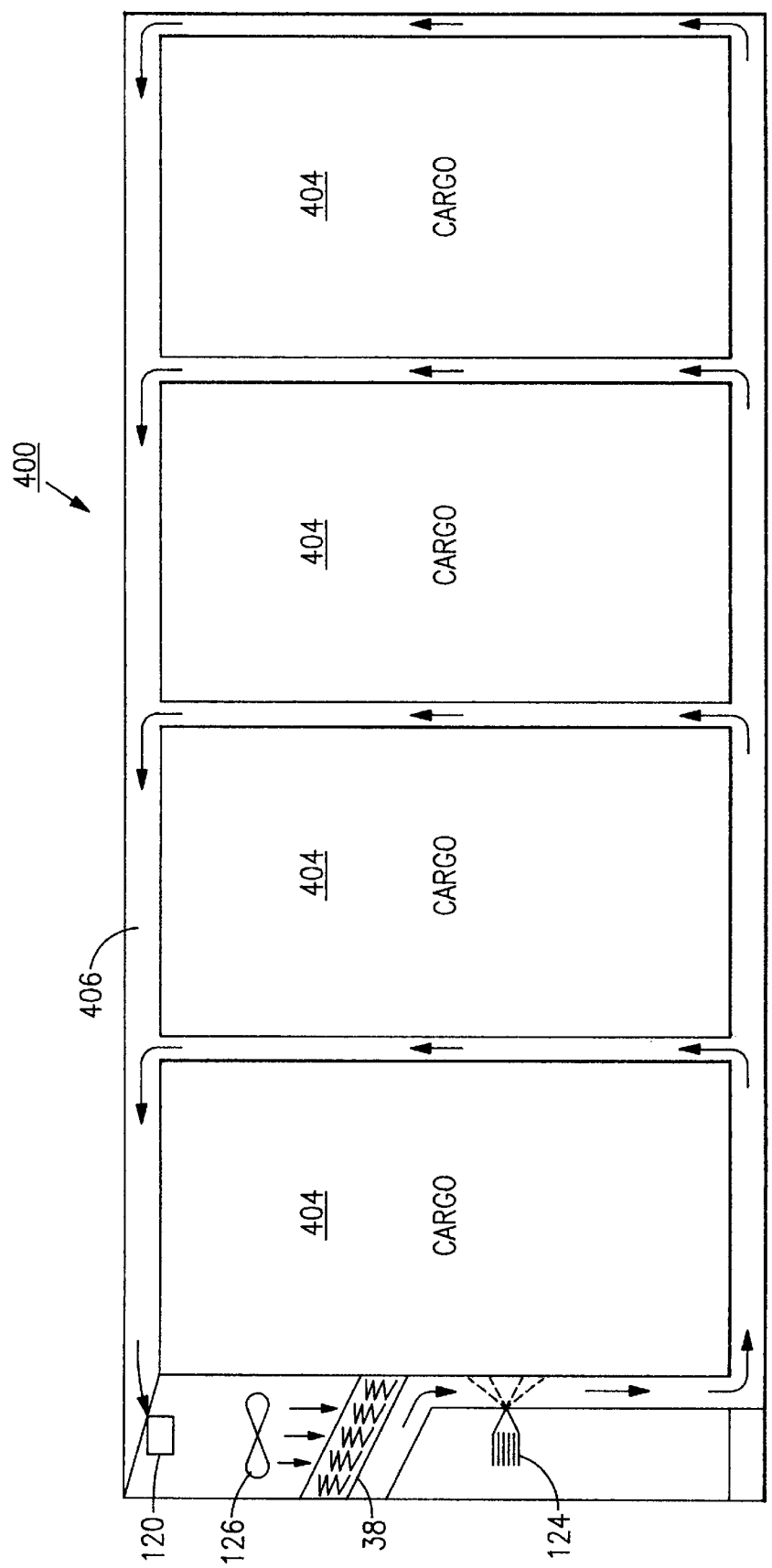
FIG. 5 illustrates a cutaway side elevation view of the humidity monitoring and control system installed on a cargo container in accordance with one embodiment of the present invention.

FIG. 5 illustrates a simplified cutaway side elevation view of a cargo container 400 loaded with cargo 404 to show the air stream paths 406 containing the air to be monitored. It can be seen that the humidity monitoring and control system 100 is formulated as part of a container refrigeration unit such that the unit evaporator 28 fans 38 are used in combination with one or more atomizer and water pump devices 124 during the refrigeration process, to simultaneously control the humidity level. Therefore, when formulated as part of a container refrigeration unit, the humidity control system 100 will function when the refrigeration controls are active and will be deactivated along with deactivation of the refrigeration controls. This process ensures that humidity levels throughout the container 400 will be consistent and that no portions of the air stream 406 have heavily saturated air pockets that could ruin portions or all of the transported cargo 404. It shall be understood that the one or more atomizer and water pump devices 124, or other water supply apparatus, could just as well be installed at prescribed locations within the cargo container 400 and that additional fans dedicated to the humidity control process could also be used to formulate a stand-alone humidity control system, so long as the desired levels of humidity within the air streams 406 are maintained.

FIG. 5 illustrates a simplified cutaway side elevation view of a cargo container 400 loaded with cargo 404 to show the air stream paths 406 containing the air to be monitored. It can be seen that the humidity monitoring and control system 100 is formulated as part of a container refrigeration unit such that the unit evaporator 28 fans 38 are used in combination with one or more atomizer and water pump devices 124 during the refrigeration process, to simultaneously control the humidity level. Therefore, when formulated as part of a container refrigeration unit, the humidity control system 100 will function when the refrigeration controls are active and will be deactivated along with deactivation of the refrigeration controls. This process ensures that humidity levels throughout the container 400 will be consistent and that no portions of the air stream 406 have heavily saturated air pockets that could ruin portions or all of the transported cargo 404. It shall be understood that the one or more atomizer and water pump devices 124, or other water supply apparatus, could just as well be installed at prescribed locations within the cargo container 400 and that additional fans dedicated to the humidity control process could also be used to formulate a stand-alone humidity control system, so long as the desired levels of humidity within the air streams 406 are maintained.

Figure 6:
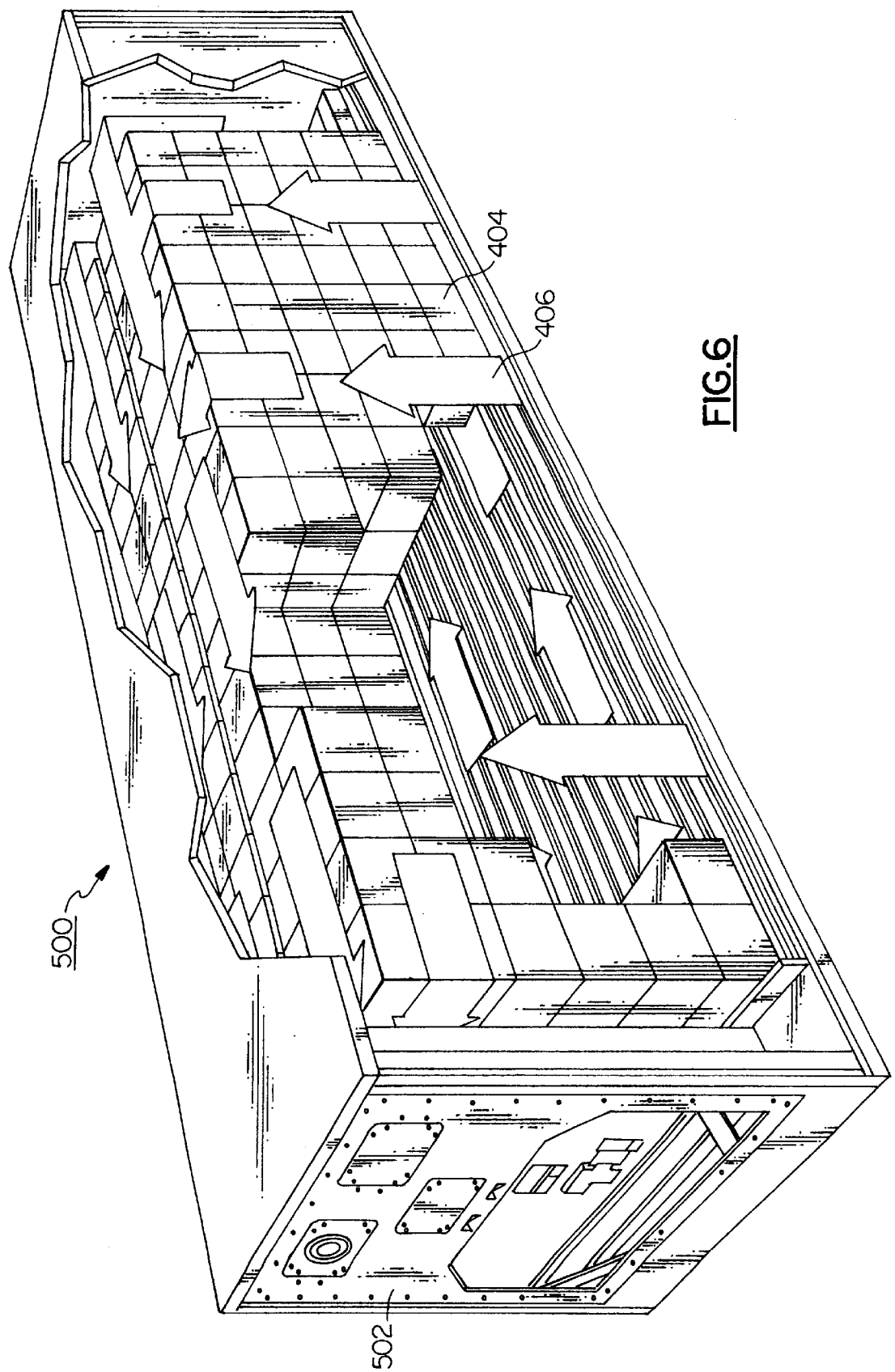
FIG. 6 is a perspective view of a loaded cargo container illustrating air flow paths that affect humidity stabilization within the loaded cargo container.

FIG. 6 is a perspective view of a refrigerated cargo container 500 having a refrigeration unit 502 loaded with cargo 404 such that air streams 406 are constructed to efficiently allow control of the humidity level within the container 500. It is known that airflow is one of the most important considerations in specifying container refrigeration. The present inventors also realized the importance of airflow in specifying container humidity to construct a properly designed humidity monitoring and control system to ensure consistent air distribution around the entire cargo 404 resulting in superior resource management thereby saving energy and eliminating waste of energy resources.

Having thus described the preferred embodiments in sufficient detail as to permit those of skill in the art to practice the present invention without undue experimentation, those of skill in the art will readily appreciate other useful embodiments within the scope of the claims hereto attached. For example, although the present invention has been described as useful in container/transport refrigeration systems, those of skill in the art will readily understand and appreciate that the present invention has substantial use and provides many benefits in other types of refrigeration systems as well. In general, the refrigeration industry would find the present invention useful in achieving reliable and efficient cooling for those products where high standards must be maintained to preserve resources.

In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

We claim:

1. A method of operating a humidity control system used in conjunction with a refrigeration system for a contained space, said control system including a computer having a memory unit, at least one H₂O source, and at least one humidity sensor, said confined space being linked to said refrigeration unit via an air circulating circuit, said circuit having start and completion ends oppositely situated relative to said refrigeration system, said method comprising the steps of:

disposing at least one humidity sensor along said air circulating circuit at the completion end of said circuit, said completion end being disposed prior to the refrigeration system, extracting digitized data from said at least one humidity sensor during operation of the refrigeration system;

storing the digitized data extracted from said at least one humidity sensor in the memory unit;

determining when to activate and when to deactivate said at least one H₂O source according to said computer responding to a computer program that processes said digitized data;

activating said at least one H₂O source according to said determining step; and deactivating said at least one H₂O source according to said determining step, wherein at least one H₂O source is disposed at the start end of said circuit, said start end being proximate to air entering the circuit from said refrigeration system.

2. The method of claim 1, wherein said at least one H₂O source includes a water pump and an atomizer.

3. The method of claim 1, wherein said determining step comprises the steps of activating said at least one H₂O source for a first time period and deactivating said at least one H₂O source for a second time period when said humidity level is below the prescribed value.

4. The method of claim 1, wherein said activating step occurs when said stored digitized data is below a prescribed value, and said deactivating step occurs when said stored digitized data is above the prescribed value.

5. The method of claim 1, including the step of determining a humidity level rate of change wherein said determining step comprises the steps of activating said at least one H₂O source for a first time period and subsequently deactivating said at least one $H_2O$ source for a second time period until said humidity level rate of change is within a calculated range.

6. A refrigeration system comprising:

a compressor having a discharge port and a suction port;

a condenser operatively coupled to the discharge port;

an evaporator operatively coupled to the suction port;

at least one humidity sensor operatively coupled to a predetermined portion of the refrigeration system, wherein the at least one humidity sensor is configured to monitor a level of humidity within a container that is being refrigerated via the refrigeration system;

at least one moisture supply device operatively coupled to a predetermined portion of the refrigeration system, wherein said at least one moisture supply device is configured to add moisture to air that is being circulated throughout said container along a circulating circuit;

at least one evaporator fan operatively coupled to the evaporator; and a humidity control system in communication with the at least one humidity sensor, the evaporator fan and the at least one moisture supply device, the humidity control system comprising:

a controller;

a data input device in communication with said controller;

a software algorithm directing said controller; and a data storage unit, wherein discrete data associated with the at least one humidity sensor and the at least one moisture supply device is stored and supplied to said controller such that said controller, directed by the software algorithm, can control operation of the at least one evaporator fan, and the at least one moisture supply device using algorithmically defined interrelationships between the discrete data associated with the at least one humidity sensor and the at least one moisture supply device such that a predetermined maximum humidity level can be maintained within the container, and in which at least one humidity sensor is disposed at a completion end of said air circulating circuit.

7. A cargo container including a humidity control system for monitoring and controlling the humidity level within said container, the system comprising:

a humidity sensor operatively coupled to a predetermined portion of the container, wherein the humidity sensor is configured to monitor a level of humidity within said container;

at least one gaseous $H_2O$ supply device operatively coupled to a predetermined portion of the container, wherein said at least one $H_2O$ supply device is configured to add moisture to air that is being circulated throughout said container; and a humidity control system interconnecting the humidity sensor and the at least one $H_2O$ supply device, the humidity control system comprising:

a data processing device;

a data input device in communication with the data processing device;

a stored computer program directing the data processing device;

a data storage unit, wherein discrete data associated with the humidity sensor is stored and supplied to the system controller such that the data processing device, responding to the computer program, can control operation of the at least one $H_2O$ supply device using algorithmically defined interrelationships between the discrete data associated with the humidity sensor, and the at least one $H_2O$ supply device, such that a predetermined maximum humidity level can be maintained within the cargo container, and an air stream circuit extending into the interior of said container, wherein a humidity sensor is disposed at a completion end of said circuit, and said at least one $H_2O$ supply device is operatively disposed at a start end of said circuit.

8. The humidity control system of claim 7 including at least one air distribution fan operatively coupled to said humidity control system wherein said at least one air distribution fan is in communication with said data processing device and controls said air distribution fan using algorithmically defined interrelationships between the discrete data associated with the humidity sensor, with the fan, and with said at least one $H_2O$ supply device, such that said predetermined maximum humidity level can be maintained within said cargo container.

9. The humidity control system of claim 7 wherein said container includes a refrigeration system, at least one air distribution fan is an evaporator fan of said refrigeration system.

10. The humidity control system of claim 7 wherein at least one $H_2O$ supply device is disposed within said container.

11. The humidity control system of claim 7 wherein said humidity sensor is disposed within said container.

12. A humidity control system for monitoring and controlling the level of humidity within a refrigerated cargo container, the system comprising:

at least one humidity sensor configured to monitor a level of humidity within the cargo container that is being refrigerated via the refrigeration system;

at least one apparatus for adding moisture to air that is being circulated throughout the cargo container;

a controller;

a data input device in communication with the controller;

a software algorithm directing the controller; and a data storage unit, wherein discrete data associated with the at least one humidity sensor, and the apparatus for adding moisture is stored and supplied to the controller such that the controller, directed by the software algorithm, can control operation of the apparatus for adding moisture using algorithmically defined interrelationships between the discrete data associated with the at least one humidity sensor, and the apparatus for adding moisture, such that a predetermined maximum humidity level can be maintained within the refrigerated cargo container; and an air circulating circuit which circulates through the interior of said container, said circuit having a start end and a completion end in which at least one humidity sensor is disposed at the completion end of said circuit and said apparatus for adding moisture is disposed at the start end of circuit.

13. The humidity control system of claim 12 wherein said apparatus for adding moisture includes at least one air circulating fan.

14. The humidity control system of claim 12 wherein the at least one apparatus for adding moisture is disposed within a container refrigeration unit.

15. The humidity control system of claim 12 wherein the at least one humidity sensor is disposed within a container refrigeration unit.

16. The humidity control system of claim 12 wherein the at least one apparatus for adding moisture is disposed within the container.

17. The humidity control system of claim 12 wherein the at least one humidity sensor is disposed within a refrigerated cargo container.

18. The humidity control system of claim 12 wherein said software algorithm includes instructions that determine an activation and a deactivation queue of said apparatus for adding moisture.

19. The humidity control system of claim 18 wherein said instructions comprise a sequence of an activation for a first time period, and a deactivation for a second time period when said humidity level is below said maximum humidity level.

20. The humidity control system of claim 18 including instructions that determine a humidity level rate of change and wherein said activation and deactivation instructions comprise a sequence of an activation for a first time period, and a deactivation until said humidity level rate of change is within a calculated range when said humidity level is below said maximum humidity level.

* * * * *